(12) United States Patent
Levin et al.

(10) Patent No.: US 11,962,584 B2
(45) Date of Patent: Apr. 16, 2024

(54) PROVIDING ZERO TRUST NETWORK SECURITY WITHOUT MODIFICATION OF NETWORK INFRASTRUCTURE

(71) Applicant: Twistlock, Ltd., Herzliya (IL)

(72) Inventors: Liron Levin, Herzliya (IL); Eran Yanay, Tel-Aviv (IL); Dima Stopel, Herzliya (IL)

(73) Assignee: Twistlock, Ltd., Herzliya (IL)

( * ) Notice: Subject to any disclaimer, the term of this patent is extended or adjusted under 35 U.S.C. 154(b) by 566 days.

(21) Appl. No.: 16/939,589

(22) Filed: Jul. 27, 2020

(65) Prior Publication Data

US 2022/0029988 A1 Jan. 27, 2022

(51) Int. Cl.
  *H04L 9/40* (2022.01)

(52) U.S. Cl.
  CPC ...... *H04L 63/0869* (2013.01); *H04L 63/0263* (2013.01); *H04L 63/0823* (2013.01); *H04L 63/166* (2013.01)

(58) Field of Classification Search
  CPC ............. H04L 63/0869; H04L 63/0263; H04L 63/0823; H04L 63/166
  See application file for complete search history.

(56) References Cited

U.S. PATENT DOCUMENTS

| | | | |
|---|---|---|---|
| 9,252,958 B1* | 2/2016 | Tempel | H04L 9/3271 |
| 2010/0037311 A1* | 2/2010 | He | H04L 63/20 |
| | | | 709/227 |
| 2017/0366395 A1* | 12/2017 | Goldfarb | H04L 67/01 |
| 2019/0329056 A1* | 10/2019 | Sjoquist | A61N 1/3987 |
| 2020/0021618 A1* | 1/2020 | Smith | H04L 63/20 |
| 2020/0136836 A1* | 4/2020 | Schiattarella | H04L 63/0823 |
| 2020/0366648 A1* | 11/2020 | Kuppannan | H04L 63/0263 |
| 2021/0328791 A1* | 10/2021 | Wei | H04L 9/088 |
| 2021/0344511 A1* | 11/2021 | Devarajan | H04L 63/0281 |

* cited by examiner

*Primary Examiner* — Trong H Nguyen
(74) *Attorney, Agent, or Firm* — Gilliam IP PLLC

(57) ABSTRACT

Zero trust network security is provided without modifying the underlying network infrastructure. Unique intermediate certificates created based on a primary certificate are sent to each of a plurality of entities. Each entity of the plurality of entities is installed on a respective node of a plurality of nodes in a network environment of a cloud provider. An agent is deployed to each of the plurality of nodes, and the agent is configured to enforce at least one network firewall policy based on the intermediate certificate sent to the corresponding entity.

26 Claims, 6 Drawing Sheets

PROVIDING ZERO TRUST NETWORK SECURITY WITHOUT MODIFICATION OF NETWORK INFRASTRUCTURE

TECHNICAL FIELD

The present disclosure relates generally to network security, and more specifically to seamlessly providing zero trust network security.

BACKGROUND

Introducing identity-based network firewalls to existing cloud network topologies which already are configured to use Transport Layer Security (TLS) or mutual TLS (mTLS) is a difficult task. Introducing identity-based network firewalls typically requires modifying code or control plane components. In addition to requiring the time and resources needed to perform such modifications, the modifications introduce new possibilities for error. In particular, errors when making these modifications can introduce security flaws which can then be exploited.

Additionally, identity-based network firewalls are susceptible to breach when a signing certificate or other data used for identification of network entities is stolen. Specifically, an entity possessing a stolen certificate may be able to successfully imitate an authorized entity and therefore get past the firewall. As a result, techniques for protecting against certificate compromise are highly desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing zero trust network security. The method comprises: sending a unique intermediate certificate authority (CA) certificate to each of a plurality of entities, wherein each entity of the plurality of entities is installed on a respective node of a plurality of nodes in a network environment; and causing deployment of an agent on each of the plurality of nodes, each agent corresponding to the entity installed on the same node as the agent is configured to enforce at least one network firewall policy based on the intermediate CA certificate sent to the corresponding entity.

Certain embodiments disclosed herein also include a non-transitory computer readable medium having stored thereon causing a processing circuitry to execute a process, the process comprising: sending a unique intermediate certificate authority (CA) certificate to each of a plurality of entities, wherein each entity of the plurality of entities is installed on a respective node of a plurality of nodes in a network environment; and causing deployment of an agent on each of the plurality of nodes, each agent corresponding to the entity installed on the same node as the agent is configured to enforce at least one network firewall policy based on the intermediate CA certificate sent to the corresponding entity.

Certain embodiments disclosed herein also include a system for providing zero trust network security. The system comprises: a processing circuitry; and a memory, the memory containing instructions that, when executed by the processing circuitry, configure the system to: send a unique intermediate certificate authority (CA) certificate to each of a plurality of entities, wherein each entity of the plurality of entities is installed on a respective node of a plurality of nodes in a network environment; and cause deployment of an agent on each of the plurality of nodes, each agent corresponding to the entity installed on the same node as the agent is configured to enforce at least one network firewall policy based on the intermediate CA certificate sent to the corresponding entity.

Certain embodiments disclosed herein also include a method for enforcing zero trust network security. The method comprises: receiving, at a first node, an entity identifier and a host certificate from a sending entity installed on a second node, wherein the first node is deployed in a network environment having a known network infrastructure, wherein the first entity is issued an intermediate certificate authority (CA) certificate from a central authority system; determining whether the received host certificate is valid based on at least one network firewall policy and the intermediate CA certificate, wherein determining whether the received host certificate is valid further comprises determining whether the received host certificate is a non-expired CA certificate issued by the central authority system; and determining whether the received entity identifier is valid based on the known network infrastructure, wherein determining whether the received entity identifier is valid further comprises determining whether the sending entity being installed on the second node is indicated in the known network infrastructure.

Certain embodiments disclosed herein also include a method for providing zero trust network security. The method comprises: sending a unique intermediate certificate authority (CA) certificate to each of a plurality of entities, wherein each entity of the plurality of entities is installed on a respective node of a plurality of nodes in a network environment; and causing deployment of an agent on each of the plurality of nodes, each agent corresponding to the entity installed on the same node as the agent; causing, by each agent, enforcement of at least one network firewall policy based on the intermediate CA certificate sent to the corresponding entity.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
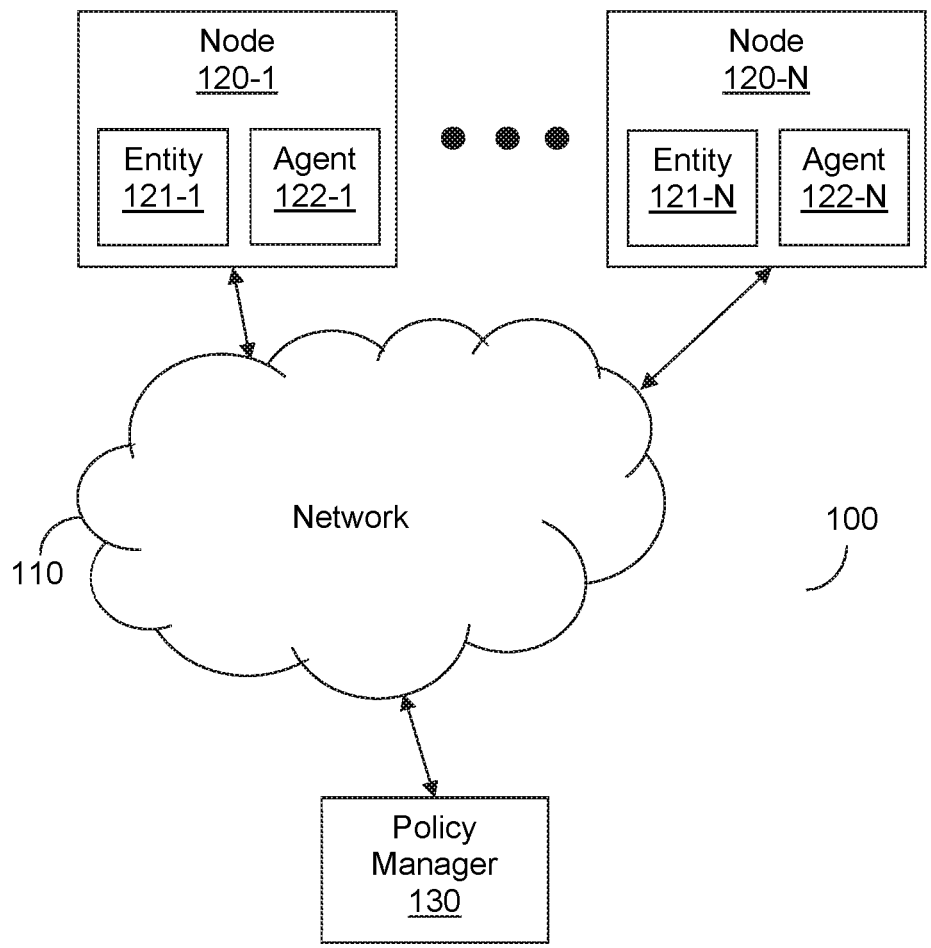
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include techniques for providing zero-trust network security in a manner that is transparent, distributed, and fault tolerant. A central authority creates a primary certificate authority (CA) certificate and intermediate CA certificates. The intermediate CA certificates are distributed among nodes in which authorized entities are deployed. The authorized entities are allowed to communicate pursuant to a network firewall policy to be enforced. An agent is deployed on each node. Each agent is configured to enforce the firewall policy using the intermediate CA certificates and other information provided by the central authority.

To enforce the firewall policy, the agent of each node is configured to receive an intermediate CA certificate from the central authority. The intermediate CA certificate indicates the host on which the central authority is deployed and on which the certificate was generated as well as a cloud provider signature for the host. When the node is a sender or receiver of a communication with another node, the node verifies that a certificate for the host includes a valid cloud provider signature (e.g., a valid signature of a cloud provider such as Amazon Web Services, Google Cloud Platform, etc.) as defined in the intermediate CA certificate. Additionally, the node receives identity data from the other node and verifies that the received identity is consistent with an infrastructure of the cloud provider. More specifically, the node verifies that an entity indicated in the identity of the other node is actually deployed on the other node by looking at the known infrastructure.

Additionally, to prevent unauthorized use of certificates, a cache is created for each entity. Each entity is configured to only route communications from external addresses defined in the network firewall policy to an agent for further processing.

The disclosed embodiments allow for enforcing identity-based network firewall policies in a seamless manner which does not require modifying entities or network infrastructure. By distributing CA certificates to and deploying agents at each node, the central authority can cause enforcement of the firewall policy in a distributed manner and without requiring modifying the underlying infrastructure. Further, the disclosed embodiments improve security by providing techniques for preventing unauthorized use of stolen certificates.

FIG. 1 shows an example network diagram 100 utilized to describe the various disclosed embodiments. In the example network diagram 100, and a plurality of nodes 120-1 through 120-N (hereinafter referred to individually as a node 120 and collectively as nodes 120, merely for simplicity purposes) and a policy manager 130 communicate via a network 110.

The network 110 may be, but is not limited to, a wireless, cellular or wired network, a local area network (LAN), a wide area network (WAN), a metro area network (MAN), the Internet, the worldwide web (WWW), similar networks, and any combination thereof.

Each node 120 may be, but is not limited to, a personal computer, a laptop, a tablet computer, a smartphone, a wearable computing device, or any other device capable of receiving and displaying notifications. Each node is (not shown) or includes (as shown) an entity 121. Each entity 121 may be, but is not limited to, an application, a service, a device, and the like.

The policy manager 130 is configured to distribute agents and enforce policy management via the nodes 120. Accordingly, the nodes 120 and the policy manager 130 collectively provide a distributed enforcement mechanism in which the policy manager 130 acts as a central authority for policy distribution and management. To this end, the policy manager 130 is configured to generate and send certificate authority (CA) certificates as well as to deploy the agents 122 on the entities 120. The agents 122, when deployed, are configured to perform at least a portion of the disclosed embodiments and, in particular, to verify identities and compliance with firewall policies using intermediate CA certificates issued by the policy manager 130.

Figure 2:
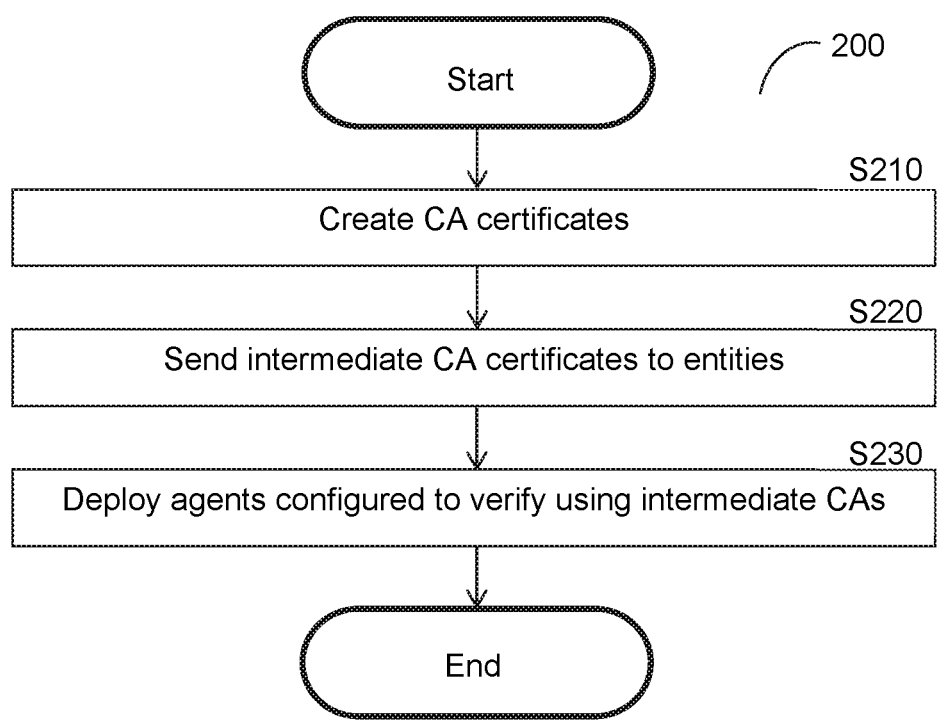
FIG. 2 is a flowchart illustrating a method for network firewall policy management according to an embodiment.

FIG. 2 is a flowchart 200 illustrating a method for network firewall policy management according to an embodiment. In an embodiment, the method is performed by the policy manager 130, FIG. 1.

At 210, a primary certificate authority (CA) certificate and intermediate CA certificates are created. The primary CA certificate and each intermediate CA certificate identifies the host on which the certificate was generated as well as a cloud provider signature identifying that host. Each intermediate CA certificate is a temporary certificate which expires after a predetermined period of time (e.g., 24 hours).

In an embodiment, the primary CA certificate is generated based on signed data from a cloud provider identifying each node in a network. To this end, in a further embodiment, S210 further includes receiving a portion of the signed data from each node. Each node is configured to fetch this signed information from the cloud provider. When the network is a cloud environment, the signed information may be fetched using one or more standard cloud provider metadata application programming interfaces.

At S220, the intermediate CA certificates are sent to respective entities installed on nodes of a network. Each entity receives a unique intermediate CA certificate. In an embodiment, new intermediate CA certificates are sent, for example, periodically (e.g., when the current period of time is about to expire). In an embodiment, S220 further includes sending network policy rules to the entities to allow for enforcing network policies. Such network policy rules may include, but are not limited to, a list of allowable network addresses.

Sending unique and temporary intermediate CA certificates allows the recipient entities to continue to communicate with each other securely even if the central authority which performs the method of FIG. 2 is temporarily unavailable (e.g., if the central authority node fails or a network connection is lost). More specifically, the securing of communications may be performed in a distributed manner which does not require participation of the central authority for any given communication. Additionally, since intermediate CA certificates are temporary, the central authority may be required to periodically communicate with the other entities, thereby ensuring that intermediate CA certificates cannot simply be stolen and utilized in perpetuity.

At S230, agents are deployed at the respective nodes on which the entities are installed. By deploying an agent at the respective node for each entity, the central authority is able to distribute the load of creating identity data (e.g., identity tokens) among the nodes based on the certificates issued by the central authority without requiring modifying the network infrastructure.

In an embodiment, each agent is a proxy configured to route all internal and external traffic, and to enforce a network firewall policy. More specifically, each agent may be configured to perform a portion of the embodiments disclosed herein such as, for example, either or both of the techniques described herein with respect to FIGS. 3 and 4.

Figure 3:
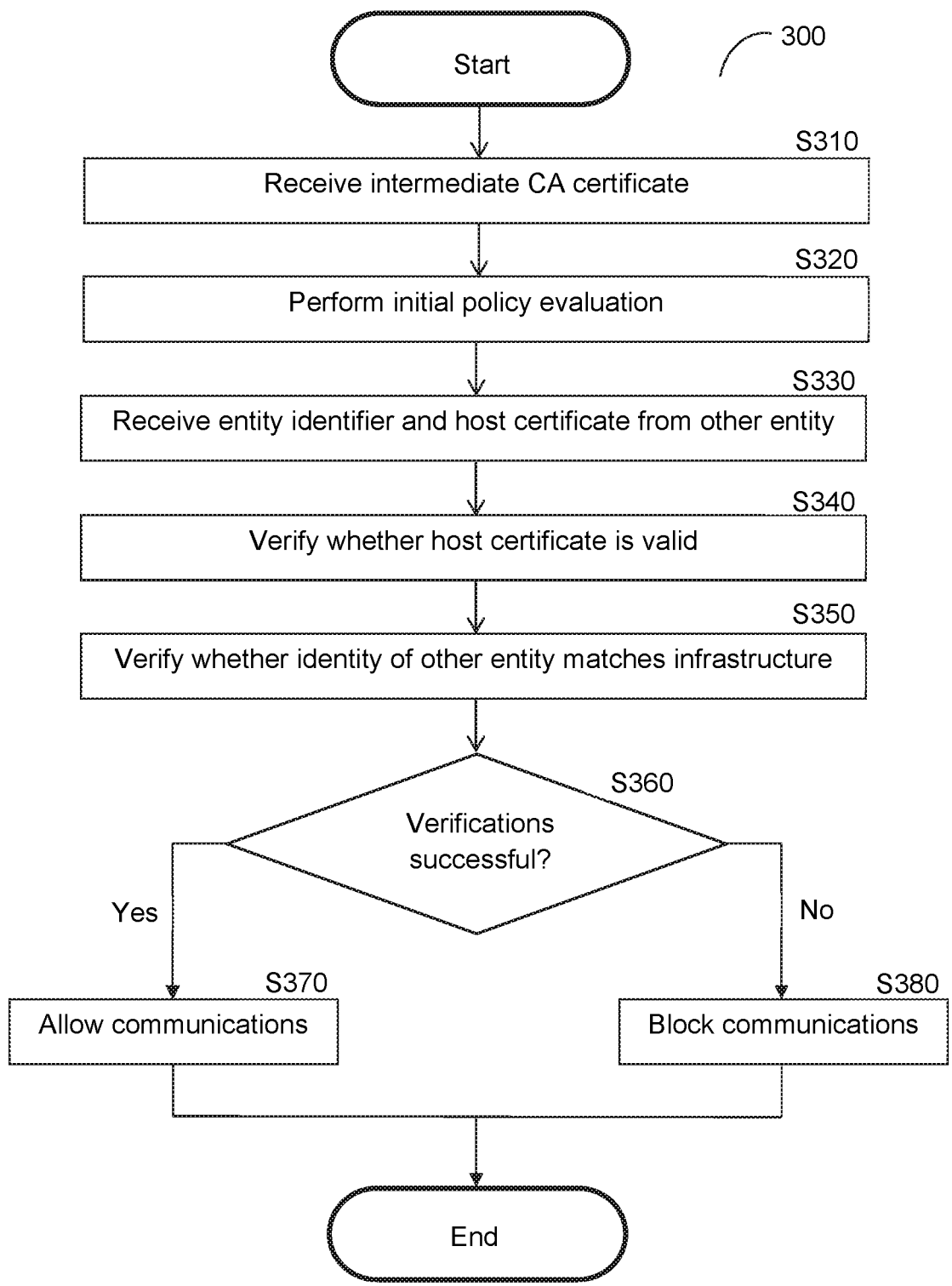
FIG. 3 is a flowchart illustrating a method for detecting compromised nodes according to an embodiment.

FIG. 3 is a flowchart 300 illustrating a method for detecting compromised nodes according to an embodiment. In an embodiment, the method is performed by one of the nodes 120, FIG. 1. More specifically, the method may be performed by an agent deployed at one of the nodes 120 such as an agent 122.

At S310, entity identifying certificates are generated based on an intermediate CA certificate received from a central authority (e.g., the policy manager 130, FIG. 1). The intermediate CA certificate, in turn, is generated based on a primary CA certificate of the central authority and signed entity identifying data of the entity performing the method of FIG. 3.

At optional S320, an initial policy evaluation is performed with respect to another entity (e.g., an entity 122 installed on another one of the nodes 120, FIG. 1) to determine whether normal communications or communications requiring authentication are to be utilized. In an embodiment, the initial policy evaluation is performed as described further below with respect to FIG. 4.

At S330, an entity identifier and a host certificate of another entity (e.g., an entity 122 installed on another one of the nodes 120, FIG. 1) are received. The entity identifier and host certificate may be received, for example, when communication is initiated with the other entity (for example, when a message is sent to or received from the other entity). The entity identifier may be, but is not limited to, an identifier token which identifies the other entity.

At S340, it is determined whether a host certificate of the other entity is valid pursuant to a first verification process. In an embodiment, a host certificate is valid if it is a non-expired CA certificate issued by the same central authority. In a further embodiment, S340 includes determining whether the certificate of the host certificate includes a valid host signature (e.g., a valid signature of a cloud provider). In an embodiment, a valid host signature includes a signature generated based on properties of the host certificate such as, but not limited to, host name, labels, a combination thereof, and the like.

In an embodiment, determining whether the host certificate is valid includes determining whether the host certificate is signed by the primary CA certificate of the central authority without checking the hostname indicated on the host certificate. To this end, S340 includes performing a custom validation procedure (e.g., a custom TLS procedure). In a further embodiment, the other party validates the entities encoded in the client certificate against the firewall policy. Since the entity performing the method of FIG. 3 has an intermediate CA certificate generated based on the primary CA certificate, the signature of the host certificate can be verified to establish identity without considering the hostname, which can be falsified more easily than signatures.

In an embodiment, the type of verification used for the first verification process depends on the types of entities that are communicating. To this end, in a further embodiment, when the entities are applications (i.e., app-to-app communication), the verification is based on the contents of the certificate. The intermediate CA certificates issued in accordance with the disclosed embodiments include fields that hold multiple properties describing an entity which can be used for verification. Since different nodes (e.g., a client and a server) will be issued intermediate CA certificates from the same central authority, the contents may be compared to verify the entity. In another embodiment, when the entities are services (i.e., service-to-service communication), the certificate of the other entity is not verified directly-rather, the properties of the certificate of the other entity are compared to requirements of the firewall policy.

At S350, it is determined whether an identity of the other entity matches a known network infrastructure pursuant to a second verification process. The known network infrastructure may be a standardized infrastructure such as, but not limited to, Kubernetes k8s. In an embodiment, S350 includes cross correlating cloud provider metadata with metadata of the network environment indicating a known network infrastructure for the network.

As a non-limiting example, a network infrastructure includes a first node 120-1 having a first entity 121-1 and a second node 120-2 having a second entity 121-2. When the first node 120-1 and the second node 120-2 communicate, data sent from the entity 121-1 to the entity 121-2 indicates that the entity 121-1 is installed on the node 120-1. The agent 122-2 of the second node 120-2 verifies that the entity 121-1 is, in fact, installed on the node 120-1 as indicated in the known network infrastructure. This may be done, for example, by checking with k8s. At the same time, the agent 122-1 on the node 120-1 may verify that the entity 121-2 is, in fact, installed on the node 120-2.

At S360, it is checked if the results of the first and second verification processes were successful and, if so, execution continues with S370, where communications with the other entity are allowed; otherwise, execution continues with S380, where communications with the other entity are blocked.

Figure 4:
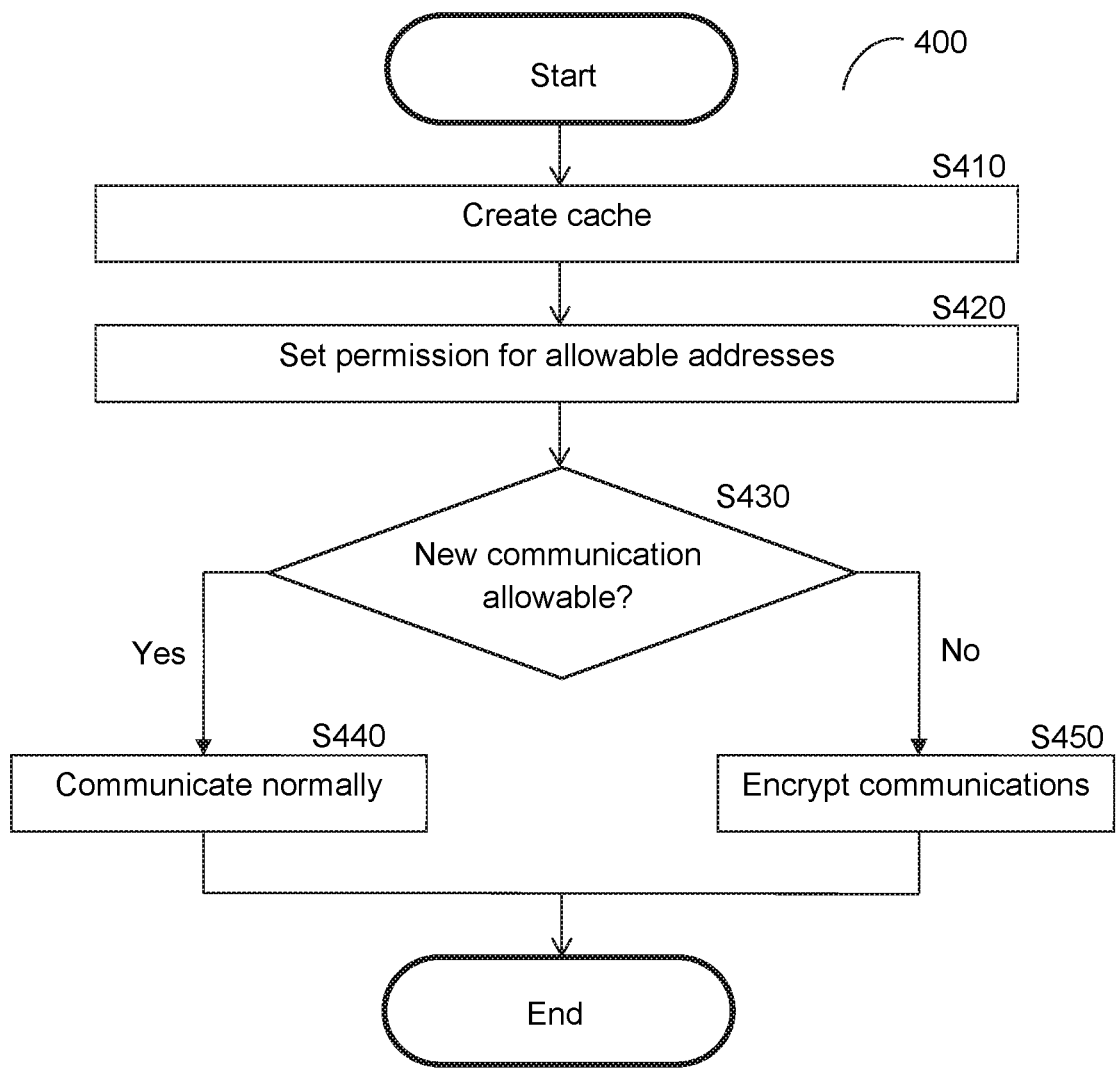
FIG. 4 is a flowchart illustrating a method for evaluating policy compliance according to an embodiment.

FIG. 4 is a flowchart 400 illustrating a method for evaluating policy compliance according to an embodiment. In an embodiment, the method is performed by one of the nodes 120, FIG. 1.

At S410, a cache is created. The cache may be, for example, a Domain Name System (DNS) cache. The cache is utilized for selectively routing traffic to the agent. More specifically, in an example implementation, all DNS resolutions are tracked and the resulting IP addresses are cached. A user-space utility program is utilized to adjust user-space addresses accordingly in order to route traffic.

At S420, permissions are set based on allowable external network addresses defined in an applicable network firewall policy. The permissions define the network addresses of nodes that this node is allowed to communicate with. The permissions may be set using a user-space utility program such as, but not limited to, iptables. The allowable external network addresses may be, but are not limited to, Domain Name System (DNS) addresses, Classless Inter-Domain Routing (CIDR) addresses, both, and the like.

At S430, when a new communication has been received from another entity at a network address, it is checked whether the other entity is a permitted entity for communications according to the set permissions. If so, execution continues with S440, where communications with the other entity are routed to an agent for compromised node detection in accordance with the disclosed embodiments. Otherwise, execution continues with S450, where communications are secured.

In an embodiment, S430 includes modifying the iptables of an agent deployed alongside the entity (e.g., an agent installed on the same node as the entity) to route traffic to the agent for network addresses that are not defined as allowable in the network firewall policy. Both the sending and receiving parties of the communication verify the trust chain to ensure that data signed by the other party to the communication is signed by an intermediate CA certificate. The trust chain, including receiver and sender metadata, may be encoded in a custom extension in the respective certificate provided by each party to the other. To this end, in an embodiment, S430 further includes verifying the trust chain to determine whether the data signed by the sending party was signed using an intermediate CA certificate and determining whether the communication is allowed pursuant to the firewall policy.

In an embodiment, S450 includes encrypting communications to be sent to the other entity and using an authentication procedure for all communications with the other entity. The authentication procedure may be, but is not limited to, a mutual authentication procedure such as mutual TLS. By allowing verified communications to occur normally and only requiring authentication procedures when communications are not verified, the disclosed embodiments allow for evaluating network firewall policies without interfering in existing TLS or mTLS communications.

Figure 5:
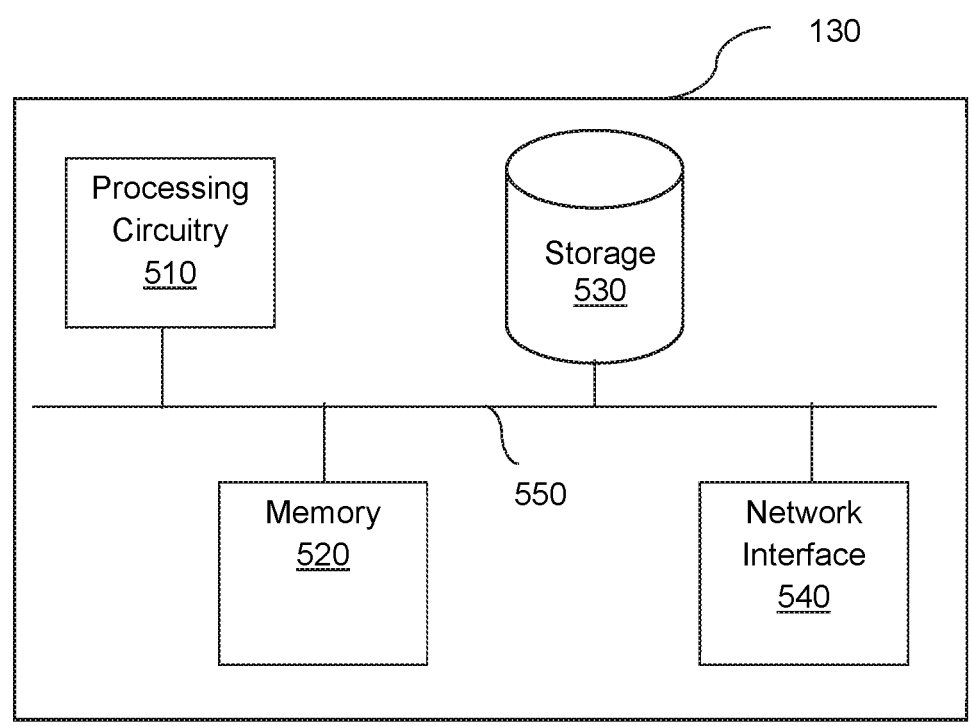
FIG. 5 is a schematic diagram of a policy manager according to an embodiment.

FIG. 5 is an example schematic diagram of a policy manager 130 according to an embodiment. The policy manager 130 includes a processing circuitry 510 coupled to a memory 520, a storage 530, and a network interface 540. In an embodiment, the components of the policy manager 130 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the policy manager 130 to communicate with the nodes 120 for purposes such as, for example, sending certificate authorities, and the like.

It should be understood that the embodiments described herein are not limited to the specific architecture illustrated in FIG. 5, and other architectures may be equally used without departing from the scope of the disclosed embodiments.

Figure 6:
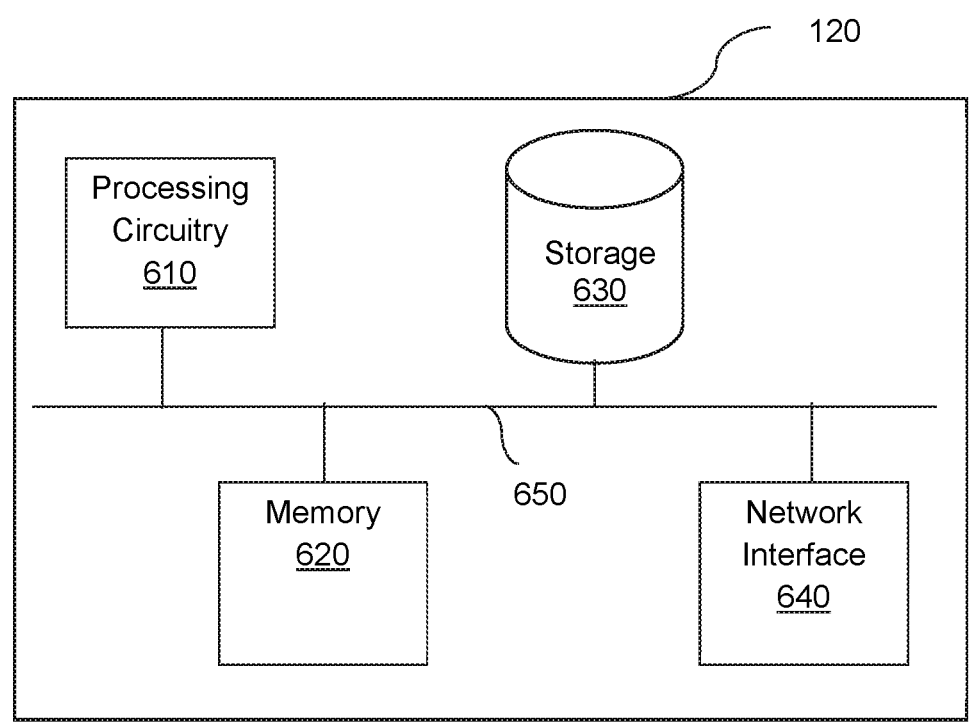
FIG. 6 is a schematic diagram of a node according to an embodiment.

FIG. 6 is an example schematic diagram of a node 120 according to an embodiment. The node 120 includes a processing circuitry 610 coupled to a memory 620, a storage 630, and a network interface 640. In an embodiment, the components of the node 120 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the node 120 to communicate with the policy manager 130 for purposes such as, for example, receiving certificate authority certificates. The network interface 640 also allows for communication with other nodes 120.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method comprising:
    creating a primary certificate based on signed data obtained from a cloud provider, wherein the signed data identify a plurality of nodes in a network environment of the cloud provider;
    creating a plurality of intermediate certificates based on the primary certificate, wherein the primary certificate and each of the plurality of intermediate certificates comprises a signature of the cloud provider, wherein each of the plurality of intermediate certificates is unique;
    sending each of the plurality of intermediate certificates to a respective one of a plurality of entities, wherein each entity of the plurality of entities is installed on a respective node of the plurality of; and
    deploying each of a plurality of agents to a respective one of the plurality of nodes, where the plurality of agents enforces a first firewall policy for respective ones of the plurality of entities based on the plurality of intermediate certificates.

2. The method of claim 1, wherein each of the plurality of agents routes traffic to and from a corresponding entity of the plurality of entities.

3. The method of claim 2 further comprising modifying iptables of each agent of the plurality of agents to route traffic to the plurality of agents, wherein modifying the iptables of each agent of the plurality of agents comprises modifying the iptables to route traffic corresponding to network addresses that are not defined as allowable in the first firewall policy to the agent.

4. The method of claim 1, wherein each of the plurality of intermediate certificates expires after a predetermined period of time.

5. The method of claim 4, further comprising:
    sending, to each entity of the plurality of entities, a new intermediate certificate prior to expiration of a respective one of the plurality of intermediate certificates sent to the entity.

6. The method of claim 1, wherein the plurality of entities comprises at least one of one or more applications and one or more services.

7. The method of claim 1 further comprising enforcing, by the plurality of agents, the first firewall policy for the respective ones of the plurality of entities, wherein enforcing the first firewall policy comprises verifying if communications of the plurality of entities are allowed based on the plurality of intermediate certificates.

8. The method of claim 7, wherein verifying if communications of the plurality of entities are allowed comprises,
    based on initiation of a communication between a first entity of the plurality of entities and a second entity, receiving, by a first agent of the plurality of agents, a certificate of the second entity;
    determining if the certificate is valid; and
    based on determining that the certificate is valid, allowing communications between the first entity and the second entity.

9. The method of claim 8, wherein determining if the certificate is valid comprises determining if the certificate comprises the signature of the cloud provider.

10. The method of claim 8 further comprising,
    based on receiving, by the first agent, an indication of an identity of the second entity, determining if the identity of the second entity is consistent with the network environment,
    wherein allowing communications between the first entity and the second entity is further based on determining that the identity of the second entity is consistent with the network environment.

11. A non-transitory computer-readable medium having stored thereon instructions executable by a processing circuitry to:
    create a primary certificate based on signed data obtained from a cloud provider, wherein the signed data identify a plurality of nodes in a network environment of the cloud provider;
    create a plurality of intermediate certificates based on the primary certificate, wherein the primary certificate and each of the plurality of intermediate certificates comprises a signature of the cloud provider, wherein each of the plurality of intermediate certificates is unique;

send each of the plurality of intermediate certificates to a respective one of a plurality of entities, wherein each entity of the plurality of entities is installed on a respective node of the plurality of nodes; and deploy each of a plurality of agents to a respective one of the plurality of nodes, wherein the plurality of agents verifies whether communications of the plurality of entities are allowed based on the plurality of intermediate certificates.

12. The non-transitory computer-readable medium of claim 11 further comprising instructions to send, to each entity of the plurality of entities, a new intermediate certificate prior to expiration of a respective one of the plurality of intermediate certificates sent to the entity, wherein each of the plurality of intermediate certificates expires after a predetermined period of time.

13. The non-transitory computer-readable medium of claim 11 further comprising instructions to verify, by the plurality of agents, whether communications of the plurality of entities are allowed, wherein the instructions to verify whether communications of the plurality of entities are allowed comprise instructions to, based on initiation of a communication between a first entity of the plurality of entities and a second entity, receive, by a first agent of the plurality of agents, a certificate of the second entity;

determine whether the certificate is valid; and based on a determination that the certificate is valid, allowing communications between the first entity and the second entity.

14. The non-transitory computer-readable medium of claim 13, wherein the instructions to determine whether the certificate is valid comprise instructions to determine whether the certificate comprises the signature of the cloud provider.

15. The non-transitory computer-readable medium of claim 13 further comprising instructions to, based on receipt by the first agent of an indication of an identity of the second entity, determine whether the identity of the second entity is consistent with the network environment, wherein the instructions to allow communications between the first entity and the second entity further comprise instructions to allow communications between the first entity and the second entity based on a determination that the identity of the second entity is consistent with the network environment.

16. The non-transitory computer-readable medium of claim 11 further comprising instructions executable by the processing circuitry to enforce, by the plurality of agents, a first firewall policy for the respective ones of the plurality of entities, wherein the instructions to enforce the first firewall policy comprise instructions to verify whether communications of the plurality of entities are allowed based on the plurality of intermediate certificates.

17. The non-transitory computer-readable medium of claim 11, wherein each of the plurality of agents routes traffic to and from a corresponding entity of the plurality of entities.

18. A system comprising:

a processing circuitry; and a memory, the memory containing instructions that, when executed by the processing circuitry, cause the system to:

create a primary certificate based on signed data obtained from a cloud provider, wherein the signed data identify a plurality of nodes in a network environment of the cloud provider;

create a plurality of intermediate certificates based on the primary certificate, wherein the primary certificate and each of the plurality of intermediate certificates comprises a signature of the cloud provider, wherein each of the plurality of intermediate certificates is unique;

send each of the plurality of intermediate certificates to a respective one of a plurality of entities, wherein each entity of the plurality of entities is installed on a respective node of the plurality of nodes; and deploy each of a plurality of agents to a respective one of the plurality of nodes, wherein the plurality of agents enforces at least a first firewall policy for respective ones of the plurality of entities based on the plurality of intermediate certificates.

19. The system of claim 18, wherein each of the plurality of agents routes traffic to and from a corresponding entity of the plurality of entities.

20. The system of claim 18, wherein each of the plurality of intermediate certificates expires after a predetermined period of time.

21. The system of claim 20 further comprising instructions that, when executed by the processing circuitry, cause the system to:

send, to each entity of the plurality of entities, a new intermediate certificate prior to expiration of a respective one of the plurality of intermediate certificates sent to the entity.

22. The system of claim 18 further comprising instructions that, when executed by the processing circuitry, cause the system to verify, by each of the plurality of agents, that communications with a corresponding entity of the plurality of entities by other entities are allowed in accordance with the first firewall policy based on a corresponding one of the plurality of intermediate certificates sent to the corresponding entity and entity identifying data received from the other entities.

23. The system of claim 22, wherein the plurality of entities comprises at least one of one or more applications and one or more services.

24. The system of claim 18 further comprising instructions that, when executed by the processing circuitry, cause the system to verify, by one of the plurality of agents corresponding to a first entity of the plurality of entities, whether a communication between the first entity and another entity is allowed in accordance with the first firewall policy based on contents of one of the plurality of intermediate certificates sent to the first entity and a host certificate sent to the first entity by the another entity.

25. The system of claim 18 further comprising instructions that, when executed by the processing circuitry, cause the system to verify, by one of the plurality of agents corresponding to a first entity of the plurality of entities, whether a communication between the first entity and another entity is allowed in accordance with the first firewall policy based on properties of a host certificate sent to the first entity by the another entity.

26. The system of claim 18 further comprising instructions that, when executed by the processing circuitry, cause the system to modify iptables of each of the plurality of agents to route traffic to the plurality of agents.

* * * * *